US011205228B2

(12) United States Patent
Greenberg et al.

(10) Patent No.: US 11,205,228 B2
(45) Date of Patent: Dec. 21, 2021

(54) PLANT PROVENANCE AND DATA PRODUCTS FROM COMPUTER OBJECT RECOGNITION DRIVEN TRACKING

(71) Applicant: iUNU, Inc., Seattle, WA (US)

(72) Inventors: Adam Phillip Takla Greenberg, San Francisco, CA (US); Matthew Charles King, Seattle, WA (US)

(73) Assignee: iUNU, Inc., Seattle, WA (US)

( * ) Notice: Subject to any disclaimer, the term of this patent is extended or adjusted under 35 U.S.C. 154(b) by 0 days.

(21) Appl. No.: 15/271,727

(22) Filed: Sep. 21, 2016

(65) Prior Publication Data

US 2018/0082375 A1    Mar. 22, 2018

(51) Int. Cl.
  *G06Q 40/06*  (2012.01)
  *G06K 9/62*   (2006.01)
  (Continued)

(52) U.S. Cl.
  CPC ............. *G06Q 40/06* (2013.01); *A01G 22/00* (2018.02); *G06K 9/00* (2013.01); *G06K 9/6215* (2013.01);
  (Continued)

(58) Field of Classification Search
  CPC ........... G06Q 40/06; G06T 7/90; A01G 22/00
  (Continued)

(56) References Cited

U.S. PATENT DOCUMENTS 5,841,883 A   11/1998  Kono et al.
7,013,284 B2   3/2006  Guyan et al.
(Continued)

FOREIGN PATENT DOCUMENTS

EP    2736318 A1    6/2014
JP    2011103870 A   6/2011
(Continued)

OTHER PUBLICATIONS

S. Nagasai, S. Jhansi Rani, Plant Disease Identification using Segmentation Techniques, Sep. 2015, International Journal of Advanced Research in Computer and Communication Engineering, vol. 4, Issue 9, pp. 411-413. (Year: 2015).*

(Continued)

*Primary Examiner* — Benjamin S Brindley
(74) *Attorney, Agent, or Firm* — Han Santos, PLLC

(57) ABSTRACT

This disclosure sets forth systems and techniques that trace plant provenance and determine a likelihood of plant spoilage within a plant growth operation. Particularly, a plant health monitoring system may monitor and record plant growth data of one or more individual plants during a plant life cycle from germination through to harvest. The plant growth data may include data relating to environmental conditions that surround the individual plants, and plant-specific data drawn from time-lapse images captured during the plant life cycle. A plant grower may use the time-lapse image data to identify changes in plant structure that indicate the degree of health of an individual plant, or the encompassing batch of plants. Further, a plant grower may use the plant growth data to generate one or more financial instruments that may be distributed to one or more financial institutions as support for securing capital to fund the plant growth operation.

20 Claims, 7 Drawing Sheets

(51) Int. Cl.
  *G06T 7/90* (2017.01)
  *G06T 7/00* (2017.01)
  *G06Q 50/02* (2012.01)
  *A01G 22/00* (2018.01)
  *G06K 9/00* (2006.01)

(52) U.S. Cl.
  CPC ............. *G06Q 50/02* (2013.01); *G06T 7/001* (2013.01); *G06T 7/90* (2017.01); *G06T 2207/10024* (2013.01); *G06T 2207/30188* (2013.01)

(58) Field of Classification Search
  USPC ....................................................... 705/36 R
  See application file for complete search history.

(56) References Cited

U.S. PATENT DOCUMENTS

| | | | |
|---|---|---|---|
| 7,184,846 | B2 | 2/2007 | Albright et al. |
| 7,711,576 | B1 | 5/2010 | Duett et al. |
| 8,145,330 | B2 | 3/2012 | Emoto |
| 8,249,926 | B2* | 8/2012 | Avey ...................... G06Q 40/00 705/14.11 |
| 8,594,375 | B1 | 11/2013 | Padwick |
| 8,613,158 | B2 | 12/2013 | Conrad |
| 8,850,742 | B2 | 10/2014 | Dubé |
| 9,565,812 | B2 | 2/2017 | Wilson |
| 9,603,316 | B1 | 3/2017 | Mansey et al. |
| 9,779,442 | B1 | 10/2017 | Cimic et al. |
| 10,002,375 | B1 | 6/2018 | Scythes et al. |
| 2003/0227487 | A1 | 12/2003 | Hugh |
| 2004/0231240 | A1 | 11/2004 | Kuiper et al. |
| 2005/0072862 | A1 | 4/2005 | Skinner |
| 2006/0196116 | A1 | 9/2006 | Zettl |
| 2007/0065857 | A1 | 3/2007 | Glaser et al. |
| 2007/0289207 | A1 | 12/2007 | May et al. |
| 2008/0066072 | A1 | 3/2008 | Yurekli et al. |
| 2009/0005247 | A1 | 1/2009 | Spiegel et al. |
| 2009/0132543 | A1 | 5/2009 | Chatley et al. |
| 2009/0164741 | A1 | 6/2009 | Takaki |
| 2010/0305966 | A1 | 12/2010 | Coulter et al. |
| 2011/0090960 | A1 | 4/2011 | Leontaris et al. |
| 2011/0137757 | A1 | 6/2011 | Paolini et al. |
| 2011/0196710 | A1* | 8/2011 | Rao ........................ G06Q 40/04 705/4 |
| 2012/0003728 | A1 | 1/2012 | Lanoue et al. |
| 2012/0109387 | A1 | 5/2012 | Martin et al. |
| 2012/0249741 | A1 | 10/2012 | Maciocci et al. |
| 2013/0006401 | A1 | 1/2013 | Shan |
| 2013/0185108 | A1 | 7/2013 | Bainbridge et al. |
| 2013/0191836 | A1 | 7/2013 | Meyer |
| 2013/0235183 | A1 | 9/2013 | Redden |
| 2013/0332205 | A1* | 12/2013 | Friedberg ............... G06Q 50/02 705/4 |
| 2014/0026474 | A1 | 1/2014 | Kulas |
| 2014/0035752 | A1 | 2/2014 | Johnson |
| 2014/0115958 | A1 | 5/2014 | Helene et al. |
| 2014/0154729 | A1 | 6/2014 | Leyns et al. |
| 2014/0168412 | A1* | 6/2014 | Shulman .................. H04N 7/18 348/89 |
| 2014/0176688 | A1 | 6/2014 | Ibamoto |
| 2014/0200690 | A1 | 7/2014 | Kumar |
| 2014/0288850 | A1 | 9/2014 | Avigdor et al. |
| 2014/0324490 | A1 | 10/2014 | Gurin |
| 2015/0015697 | A1* | 1/2015 | Redden .................. G01B 11/24 348/89 |
| 2015/0026092 | A1 | 1/2015 | Abboud et al. |
| 2015/0120349 | A1 | 4/2015 | Weiss |
| 2015/0131867 | A1 | 5/2015 | Lin et al. |
| 2015/0185995 | A1 | 7/2015 | Shoemaker et al. |
| 2015/0227707 | A1 | 8/2015 | Laws et al. |
| 2015/0230409 | A1 | 8/2015 | Nicole et al. |
| 2015/0261803 | A1 | 9/2015 | Song et al. |
| 2015/0295877 | A1 | 10/2015 | Roman |
| 2016/0026940 | A1* | 1/2016 | Johnson ............... A01B 79/005 705/7.11 |
| 2016/0050840 | A1 | 2/2016 | Sauder et al. |
| 2016/0050862 | A1 | 2/2016 | Walliser |
| 2016/0086032 | A1 | 3/2016 | Pickett |
| 2016/0127599 | A1 | 5/2016 | Medicherla et al. |
| 2016/0140868 | A1 | 5/2016 | Lovett et al. |
| 2016/0148104 | A1* | 5/2016 | Itzhaky ................. G06K 9/6272 706/12 |
| 2016/0205872 | A1 | 7/2016 | Chan et al. |
| 2016/0216245 | A1 | 7/2016 | Sutton |
| 2016/0239709 | A1 | 8/2016 | Shriver |
| 2016/0278300 | A1 | 9/2016 | Clendinning et al. |
| 2016/0345517 | A1 | 12/2016 | Cohen et al. |
| 2017/0030877 | A1 | 2/2017 | Miresmailli et al. |
| 2017/0038749 | A1 | 2/2017 | Mewes et al. |
| 2017/0039657 | A1 | 2/2017 | Honda et al. |
| 2017/0064912 | A1* | 3/2017 | Tabakman ............. A01G 31/06 |
| 2017/0068924 | A1 | 3/2017 | Tanaka et al. |
| 2017/0286772 | A1 | 10/2017 | Workman et al. |
| 2017/0300846 | A1 | 10/2017 | Harwood |
| 2017/0374323 | A1 | 12/2017 | Gornik |
| 2018/0039261 | A1 | 2/2018 | Haller et al. |
| 2018/0276504 | A1 | 9/2018 | Yamaguchi et al. |
| 2018/0325051 | A1 | 11/2018 | Brandao et al. |
| 2019/0034736 | A1 | 1/2019 | Bisberg et al. |
| 2019/0212316 | A1 | 7/2019 | Sutton |

FOREIGN PATENT DOCUMENTS

| | | |
|---|---|---|
| KR | 20130005540 A | 1/2013 |
| KR | 20140077513 A | 6/2014 |
| KR | 20140114089 A | 9/2014 |
| KR | 20150000435 A | 1/2015 |
| WO | 2011115666 A2 | 9/2011 |
| WO | 2014100502 A1 | 6/2014 |

OTHER PUBLICATIONS

European Patent Application No. 17853934.2, Office Action dated Dec. 11, 2020, 7 pages.
U.S. Appl. No. 15/891,110, Notice of Allowance dated Feb. 18, 2021, 17 pages.
U.S. Appl. No. 15/891,110, Notice of Allowance dated Mar. 18, 2021, 16 pages.
U.S. Appl. No. 16/859,891, Final Office Action dated Feb. 19, 2021, 32 pages.
U.S. Appl. No. 15/271,749, Non-Final Office Action dated Sep. 11, 2020, 63 pages.
U.S. Appl. No. 16/859,891, Non-Final Office Action dated Sep. 14, 2020, 40 pages.
U.S. Appl. No. 15/891,110, Final Office Action, dated Dec. 17, 2018, 13 pages.
U.S. Appl. No. 15/271,630, Office Action, dated Sep. 26, 2018, 18 pages.
U.S. Appl. No. 15/271,658, Office Action, dated Sep. 19, 2018, 8 pages.
Final Office Action for U.S. Appl. No. 15/271,569, dated Apr. 24, 2018, 18 pages.
Non-Final Office Action for U.S. Appl. No. 15/271,569, dated Jan. 23, 2018, 33 pages.
Non-Final Office Action for U.S. Appl. No. 15/891,110, dated Jul. 13, 2018, 15 pages.
International Search Report and Written Opinion for PCT Application No. PCT/US2017/052800 dated Jan. 16, 2018, 14 pages.
International Search Report and Written Opinion for PCT Application No. PCT/US2017/052805 dated Jan. 9, 2018, 14 pages.
Augustin et al., "A framework for the extration of quantitative traits from 2D images of mature *Arabidopsis thaliana*," Machine Vision and Applications, vol. 27, Issue 5 (Oct. 16, 2015), pp. 647-661.
Nagasai, et al., "Plant Disease Identification using Segmentation Techniques," International Journal of Advanced Research in Computer and Communication Engineering, vol. 4, Issue 9 (Oct. 5, 2015), pp. 411-412.

(56) References Cited

OTHER PUBLICATIONS

Patil et al., "A Survey on Methods of Plant Disease Detection," International Journal of Science and Research (IJSR), vol. 4, Issue 2 (Feb. 2015), pp. 1392-1396.
Sannakki et al., "Comparison of Difference Leaf Edge Detection Algorithms Using Fuzzy Mathematical Morphology," International Journal of Innovations in Engineering and Technology (IJIET), vol. 1, Issue 2 (Aug. 2012), pp. 15-21.
U.S. Appl. No. 15/271,658, Notice of Allowance dated May 5, 2020, 47 pages.
U.S. Appl. No. 15/891,110, Final Office Action dated May 1, 2020, 31 pages.
European Patent Application No. 17853934.2, Extended European Search Report dated Dec. 13, 2019, 10 pages.
Funk et al: "Interactive worker assistance", Pervasive and Ubiquitous Computing, ACM, 2 Penn Plaza, Suite 701 New York NY 10121-0701 USA, Sep. 12, 2016 (Sep. 12, 2016), pp. 934-939, XP058279126, DOI: 10.1145/2971648.2971706 ISBN: 978-1-4503-4461-6.
Nagasai et al: "Plant Disease Identification using Segmentation Techniques", International Journal of Advanced Research in Computer and Communication Engineering, vol. 4, No. 9, Sep. 1, 2015 (Sep. 1, 2015), XP55500057, DOI: 10.17148/IJARCCE.2015.4988.
Sagar Patil et al: "A Survey on Methods of Plant Disease Detection", International Journal of Science and Research, vo 1. 4, No. 2, Feb. 1, 2015 (Feb. 1, 2015), pp. 1392-1396, XP55500036.
European Patent Application No. 17853932.6, Extended European Search Report dated Feb. 21, 2020, 12 pages.
Qing Yao et al: "Application of Support 1-15 Vector Machine for Detecting Rice Diseases Using Shape and Color Texture Features", Engineering Computation, 2009. ICEC 109. International Conference On, IEEE, Piscataway, NJ, USA, May 2, 2009 (May 2, 2009), pp. 79-83, XP031491490,ISBN: 978-0-7695-3655-2 * the whole document*.
Shah Jitesh P. et al: "A survey on detection and classification of rice plant diseases", 2016 IEEE International Conference on Current Trends in Advanced Computing (ICCTAC), IEEE, Mar. 10, 2016 (Mar. 10, 2016), pp. 1-8, XP032960803, DOI: 10.1109/ICCTAC.2016.7567333 [retrieved on Sep. 13, 2016] *abstract* *Sec.VII* * Sec. V * * figure.
U.S. Appl. No. 15/271,749, Final Office Action dated Jun. 30, 2021, 86 pages.
International Application No. PCT/US2019/013927, International Search Report and Written Opinion dated May 7, 2019, 9 pages.
Jean et al. AR Plants: Herbal Plant Mobile Application utilizing Augmented Reality. Dec. 2017. [retrieved on Apr. 1, 2019]. Retrieved from the Internet:<URL:http://delivery.acm.org/10.1145/3170000/3168426/>. entire document.
U.S. Appl. No. 15/271,658, Final Office Action dated Jul. 29, 2019, 31 pages.
U.S. Appl. No. 15/271,630, Final Office Action dated Apr. 17, 2019, 11 pages.
Vaglica, "Shrub Pruning Dos and Donts", Aug. 3, 2016, https://www.thisoldhouse.com/ideas/shrub-pruning-dos-and-donts (Year: 2016).
U.S. Appl. No. 15/271,630, Notice of Allowance dated Nov. 20, 2019, 22 pages.
U.S. Appl. No. 15/271,749, Non Final Office Action dated Oct. 16, 2019, 58 pages.
U.S. Appl. No. 15/891,110, Non Final Office Action dated Oct. 24, 2019, 32 pages.
U.S. Appl. No. 15/271,658, Non Final Office Action dated Jan. 8, 2020, 36 pages.

\* cited by examiner

PLANT PROVENANCE AND DATA PRODUCTS FROM COMPUTER OBJECT RECOGNITION DRIVEN TRACKING

BACKGROUND

Plant growers regularly face high costs when sowing a new crop at the beginning of a planting season, and are often unable to recoup those costs until the crop is harvested. As a result, plant growers may rely on financial institutions, investors, or commercial retailers, as a source of financing their plant growth operation at the beginning of the planting season. Financing may take the form of commercial plant purchasing agreements with commercial retailers, or futures, options, or other financial instruments with financial institutions or investors.

Typically, however, plant growers assume a high level of risk when securing such financing due to the perceived unpredictability of plant loss and spoilage, and the imprecision of harvest date predictions, both of which may impact the market price of a harvested crop.

Plant growers attempt to reduce financing costs by quantifying the risk of plant loss and spoilage, and providing harvest date predictions. However, present methods of quantifying the risk of plant loss and spoilage are imprecise; and, present methods of predicting a harvest date provide only a timeframe that spans varying market conditions, making it difficult to estimate a financial return of a harvest. Absent a more accurate means of predicting the likelihood of plant loss and spoilage, and a more precise method of predicting a harvest date, plant growers are left burdened with a high cost of financing plant growth operations.

Therefore, there is a need to provide a more accurate estimate of plant loss and spoilage during a plant life cycle, and a more precise method of predicting a harvest date.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
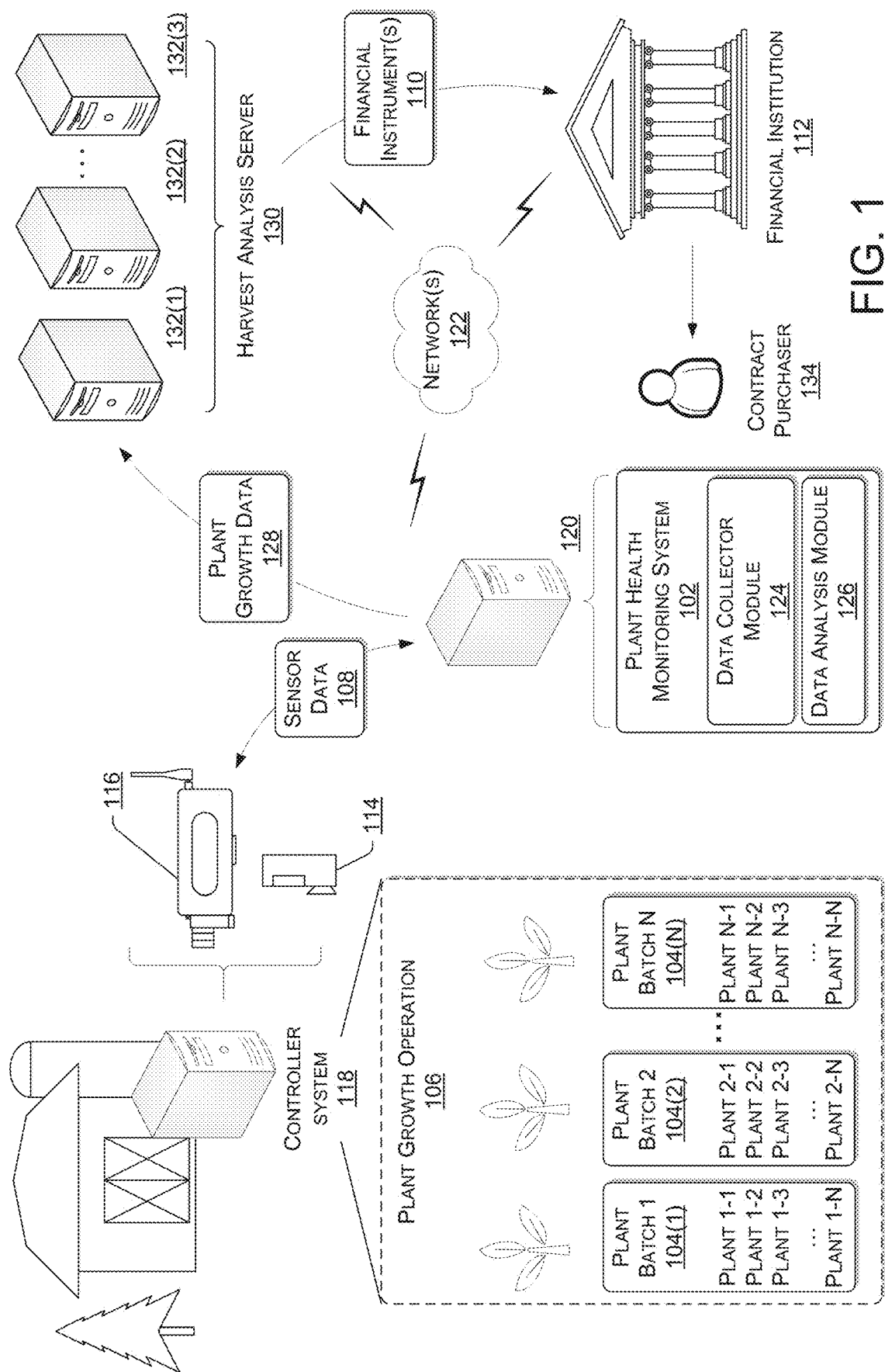
FIG. 1 illustrates a schematic view of a plant health monitoring system that captures sensor data associated with individual plants, and batches of plants within a plant growth operation.

This disclosure sets forth techniques that trace plant provenance and determine a likelihood of plant loss and spoilage within a plant growth operation. Further, this disclosure sets forth techniques for predicting a harvest date. Predicting a harvest date may allow a plant grower to predicate a date for planting a new crop. Doing so may allow the plant grower to align the harvest date of a new crop with peak market conditions.

Particularly, this disclosure describes a plant health monitoring system that monitors and records plant growth data of individual plants, from germination through to harvest. Plant growth data may include environmental data of conditions surrounding individual plants or batches of plants, and health data associated with individual plants. Plant growth data may be captured by one or more sensor(s) that are communicatively coupled to a controller system within the plant growth operation. The one or more sensor(s) may include environmental sensor(s) and image capturing device(s). In some examples, the controller system may transmit the sensor data to the plant health monitoring system for further processing and analysis. In other examples, the controller system may process and/or analyze the sensor data prior to transmission to the plant health monitoring system.

Environmental sensor(s) may capture data relating to conditions surrounding individual plants and batches of plants within the plant growth operation. Environmental sensors may include, but are not limited to, range-finding sensors, non-contact infra-red temperature sensors, hygrometers, thermal sensors, photoelectric sensors that detect changes in color, carbon dioxide uptake sensors, and oxygen production sensors. Environmental data may be processed to identify changes in the uptake of carbon dioxide, production of oxygen, thermal radiation of individual plant(s), or a moisture content of the air within the plant growth operation.

The controller system may continuously record environmental data from the environmental sensors within the plant growth operation. Alternatively, the controller system may only record environmental data based on detecting a triggering event. A triggering event may be an indication that environmental data falls below a predetermined threshold. Alternatively, or additionally, a triggering event may be an indication that environmental data reflects a significant departure from the previously monitored data. In some examples, triggering event may be determined by the controller system. In other examples, the triggering event may be determined by the plant health monitoring system. For example, the controller system may transmit environmental data to the plant health monitoring system for processing and analysis. The plant health monitoring system may determine that a triggering event has occurred, and transmit an indication to the controller system to commence recording environmental data.

Additionally, or alternatively, a triggering event may be based on probability clustering of environmental data that relates to individual plants, or batches of plants. For example, environmental data, and/or image data, may indicate a change in color of a single leaf of an individual plant. In doing so, the change in color of a single leaf may not be determined to be a triggering event. However, if the environmental data, and/or image data, indicates clusters of leaves with similar color changes, the clustering of color change may be determined to be a triggering event. In some examples, a triggering event based on environmental data may also cause image capturing device(s) to capture image data of individual plants, or batches of plants that caused the triggering event.

In another example, a triggering event may be based on environmental data that indicates a rate of photosynthesis of an individual plant, or batches of plants. For example, the rate of photosynthesis may be determined by measuring an uptake of carbon dioxide and a production of oxygen. A fall in the rate of photosynthesis below a predetermined threshold may be determined as a triggering event.

Further, image capturing device(s) may capture image data relating to the health of individual plants. Image data may include visual images and hyperspectral images. The image data may be used to trace visual and hyperspectral changes in individual plants. For example, changes in the shape, size, and color of plant structure may be captured within image data over a predetermined period of time. Plant structure may include leaves, branches, and stem structure.

Further, image capturing device(s) may capture image data continuously, or based on a time-lapse technique whereby the frequency at which image frames are captured is lower than the frequency at which the images are viewed. For example, an image of a plant may be captured at frequency of one frame per hour, then played back at a frequency of 24 frames per second. The result is a playback sequence of images that represents a 24-hour day in one second. Alternatively, or additionally, image data may be captured in response to a triggering event. The triggering event may be determined by the controller system or the plant health monitoring system, and may be based on image data or environmental data. In one non-limiting example, the triggering event may be based on sensor data indicating a change in the relative position of an individual plant with its surroundings. In a second non-limiting example, a triggering event may be based on an indication that environmental data exceeds a predetermined threshold. Predetermined thresholds may relate to the heat signatures of individual plants, colors of leaf structure, uptake of carbon dioxide, production of oxygen, or moisture content of the air within the plant growth operation. In some examples, a triggering event based on image data may also cause environmental sensors to capture environmental data of individual plants, or batches of plants that caused the triggering event.

In various examples, image data may be processed using object recognition algorithms that generate and identify image-based signatures for each individual plant within a batch of plants. Object recognition algorithms may identify an individual plant irrespective of its physical location. For example, if a particular plant is moved within the plant growth operation, the particular plant may be identified at its initial and final positions based on its image-based signature. Once the particular plant has been identified, related image data may be associated with a corresponding database record.

The plant health monitoring system may transmit an alert to a plant grower in response to determining that a triggering event has occurred. The alert may indicate the cause of the triggering event, as well as provide the plant grower with electronic access to relevant environmental data and/or image data. The alert may also indicate potential plant loss and spoilage. For example, a triggering event that is caused by a fall in the rate of photosynthesis may flag a potential problem that may impact the quality of the plant growth operation. Further, such an alert may enable plant growers to quarantine or recall defective products.

In various examples, the plant health monitoring system may analyze plant growth data. The plant growth data, which includes the environmental data and image data from the controller system, may be used to quantify a plant health metric that describes a likelihood of plant maturity, loss, or spoilage during its life cycle. The plant health metric may be updated in real-time to reflect a current health status of an individual plant, a batch of plants, or entire plant growth operation. A benefit of doing so is to allow a plant grower to forecast, in real-time, an updated risk associated with spoilage of a current growth operation.

Plant growth data and plant health metrics of individual plants may be leveraged to provide plant growers and quality control personnel with a snapshot of plant provenance and traceability, which may be useful when investigating an origin of defective plants. The plant health monitoring system may leverage plant growth data to identify the origin of defective plants, and trace all processes, actions taken by a plant grower during the plant life cycle. In instances where an individual plant is infected with a disease, other plants within the same batch of plants can be identified and quarantined.

Plant growth data and plant health metrics may also be used to generate a financial risk assessment of a current growth operation. A plant grower may be required to secure capital to funds a plant growth operation. To mitigate the cost of financing, the plant growth data and the plant health metrics may be used to provide an accurate risk assessment of plant loss and spoilage during a plant life cycle, as well as a precise prediction of a harvest date.

The term "techniques," as used herein, may refer to system(s), method(s), computer-readable instructions, module(s), algorithms, hardware logic, and/or operation(s) as permitted by the context described above and throughout the disclosure.

FIG. 1 illustrates a schematic view of a plant health monitoring system 102 that monitors individual plants and batches of plants 104 within a plant growth operation 106. The plant health monitoring system 102 may capture sensor data 108 that can be analyzed to assess a likelihood of plant maturity, quality, and spoilage. FIG. 1 further illustrates a process of generating a financial risk assessment of plant spoilage based at least in part on the sensor data 108. The financial risk assessment may be used to generate one or more financial instrument(s) 110 for distribution to financial institution(s) 112 as support for securing capital to fund the plant growth operation. Further, the financial risk assessment may be used to generate futures data that may be sold to financial institution(s) 112.

In the illustrated example, the plant health monitoring system 102 may receive sensor data 108 from one or more sensor(s) 114 116 that monitor a plant growth operation. The one or more sensor(s) 114 116 may be fixed installations within the plant growth operation 106. Alternatively, or additionally, the one or more sensor(s) 114 116 may be drone mounted to monitor the plant growth operation 106. Further, the one or more sensor(s) 114 116 may include environmental sensor(s) 114 that capture environmental data of conditions surrounding individual plants or batches of plants. In some examples, each individual plant may have a dedicated set of environmental sensor(s) 114 that capture environmental data. The environmental data may include thermal radiation of individual plants, color of individual plants, uptake of carbon dioxide production of oxygen, or moisture content of the air within the plant growth operation. Environmental sensor(s) 114 may include, but are not limited to, range-finding sensors, non-contact infra-red temperature sensors, thermal sensors, photoelectric sensors that detect changes in color, carbon dioxide uptake sensors, and oxygen production sensors.

Further, the one or more sensor(s) 114 116 may include image capturing device(s) 116 capable of capturing image data that includes visual images and hyperspectral images. The image data may be used to determine temporal changes in shape, size, and color of plant structure over a predetermined period of time. Plant structure may include plant leaves, branches, and stem structure. In some examples, each individual plant may have a dedicated set of image capturing device(s) 116 that capture visual and hyperspectral images. The image capturing device(s) 116 may capture image data to develop a three dimensional model of an individual plant. In this example, at least two image capturing device(s) 116 may capture image data of an individual plant from at least two different angles, creating at least two different lines of sight. The lines of sight may be processed via a stereoscopic analysis or structured light analysis to develop a three-dimensional model of the individual plant. In some examples, the three-dimensional model may be used as an image-based signature of the individual plant.

The image capturing device(s) 116 may capture image data continuously, based on a time-lapse technique, or in response to a triggering event. In a non-limiting example, the triggering event may be based on an indication that environmental data exceeds a predetermined threshold. In another non-limiting example, the triggering event may be based on a change in the relative position of an individual plant with its surroundings. In some instances, the change in relative position may be based on an analysis of temporally sequential image data. In other instances, the change in relative position may be based on motion detected by one or more motion sensors associated with the image capturing devices(s) 116.

In the illustrated example, the one or more sensor(s) 114 116 may be communicatively coupled to a controller system 118 of the plant growth operation 106. The controller system 118 may operate on one or more computing device(s) that include one or more interfaces that enable communications with other electronic device(s) via the one or more network(s) 122. The other electronic device(s) may include the plant health monitoring system 102.

The controller system 118 may transmit the sensor data 108, in a raw data format, to the plant health monitoring system 102, via the one or more network(s) 122. In other examples, the controller system 118 may process the sensor data 108 and transmit the sensor data 108, once processed, to the plant health monitoring system 102, via the one or more network(s) 122.

In the illustrated example, the plant health monitoring system 102 may operate on one or more computing device(s) 120. The one or more computing device(s) 120 may include one or more interfaces that enable communications with electronic device(s) via one or more network(s) 122. The electronic device(s) may include any sort of electronic device, such as a cellular phone, a smart phone, a tablet computer, an electronic reader, a media player, a gaming device, a personal computer (PC), a laptop computer, etc. Further, the one or more network(s) 122 may include public networks such as the Internet, private networks such as an institutional and/or personal intranet, or some combination of private and public networks. The one or more network(s) 122 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof.

In the illustrated example, the plant health monitoring system 102 may include a data collector module 124. The data collector module 124 may receive sensor data 108 from the controller system 118. The sensor data 108 may be aggregated and stored on a per individual plant basis, a per plant batch basis, and a per growth operation basis. The purpose of doing so allows a plant grower to monitor the overall health of a plant growth operation over a predetermined period of time, while also being able to identify and isolate particular individual plants that may be inherently defective.

In the illustrated example, the plant health monitoring system 102 may include a data analysis module 126 that identifies changes in the characteristics of an individual plant. The data analysis module 126 may employ object recognition algorithms to analyze image data and determine changes in shape, size, and color of individual plants. Further, the data analysis module 126 may process environmental data received from the controller system to identify changes in environmental characteristics, such as a change in color of plant structure, an uptake of carbon dioxide, production of oxygen, thermal radiation of individual plant(s), or a moisture content of the air within the plant growth operation. The data analysis module 126 may further temporally correlate environmental data with image data of individual plants. Doing so may provide the plant grower with a clearer understanding of plant growth progress.

In the illustrated example, the plant health monitoring system 102 may aggregate the analyses of individual plants and batches of plants 104 to generate plant growth data 128. The plant growth data 128 may be transmitted to a harvest analysis server 130 for further computation, as noted below. It is noteworthy that the functions performed by the harvest analysis server 130 may also be performed by the one or more computing device(s) 120 of the plant health monitoring system 102.

In the illustrated example, the harvest analysis server 130 may operate on one or more distributed computing resource(s). The one or more distributed computing resource(s) may include one or more computing device(s) 132 that operate in a cluster or other configuration to share resource, balance load, increase performance, provide failover support or redundancy, or for other purposes. Further, the one or more computing device(s) 132 may include one or more interfaces that enable communications with electronic device(s) via the one or more network(s) 122.

The harvest analysis server 130 may analyze the plant growth data 128 of individual plants and generate plant health metric(s). Plant health metric(s) may describe the likelihood of plant maturity, loss, or spoilage during the plant life cycle. The plant health metric(s) may be defined per individual plant, per batch of plants 104, and per plant growth operation 106. The harvest analysis server 130 may receive plant growth data 128 in real-time and accordingly update plant health metric(s) to reflect a current health status. The harvest analysis server 130 may employ probabilistic machine learning analysis algorithms to help interpret plant growth data 128. For example, image data and environmental data may identify a discoloration in the leaf structure of an individual plant. Probabilistic machine learning analysis algorithms, along with reference environmental and image data, may help diagnose the cause of the discoloration. In some examples, the reference environmental and image data may be sourced from earlier iterations of plant growth operations, or a third party service. In other examples, the harvest analysis server 130 may reference lookup tables to help diagnose and interpret plant growth data.

Further, the harvest analysis server 130 may use the plant growth data 128 and the plant health metric(s) to predict a precise harvest date and generate a financial risk assessment of the plant growth operation 106. The harvest date prediction may be based on the plant health metric(s) and current progress through the plant life cycle. The financial risk assessment may quantify, in financial terms, the risk of plant loss and spoilage within the plant growth operation 106. The financial risk assessment may be used to mitigate the cost of financing the necessary capital to fund the plant growth operation 106. Further, the financial risk assessment may be used to generate one or more financial instrument(s) 110 that may be sold to financial institution(s) 112. The one or more financial instrument(s) 110 may take the form of future contracts, options, or any other financial instrument that leverages data from the financial risk assessment to predict a price of a future plant harvest. Further, the one or more financial instrument(s) 110 may be offered to financial institution(s) 112 for the purpose of on-selling to a contract purchaser 134. A contract purchaser 134 may be a consumer, farmer, retailer, hedging trader, or institutional trader with an interest in investing in the production and supply of plant products.

A financial risk assessment can provide a real-time financial risk assessment of the maturity, loss, and spoilage of a plant growth operation 106. As the plant life cycle progresses, the financial risk assessment may be dynamically updated to reflect an updated health status. As a harvest date approaches, a real-time financial risk assessment can refine the likelihood of plant loss or spoilage, which may help mitigate the cost of financing additional capital.

Figure 2:
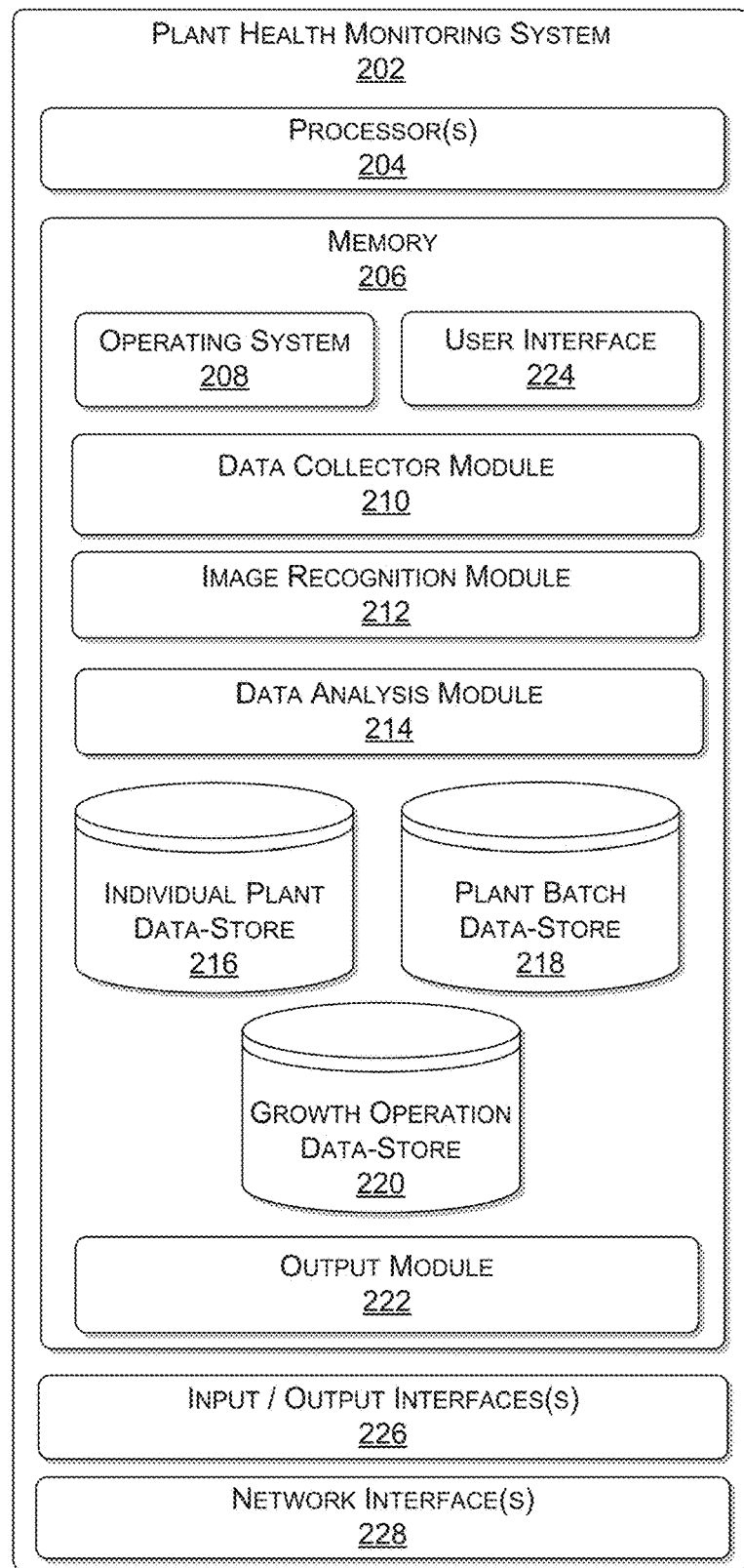
FIG. 2 illustrates a block diagram of a plant health monitoring system that monitors plant maturity, quality, and spoilage of individual plants and batches of plants within a plant growth operation.

FIG. 2 illustrates a block diagram of a plant health monitoring system 202 that monitors plant maturity, quality, and spoilage of individual plants and batches of plants within a plant growth operation. The plant health monitoring system 202 may receive sensor data 108 from a controller system 118 of the plant growth operation 106. The sensor data 108 may include environmental data that relates to environmental conditions surrounding individual plants and batches of plants, and image data of individual plants and batches of plants. The image data may include visual images and hyperspectral images.

In the illustrated example, the plant health monitoring system 202 may correspond to the plant health monitoring system 102, and may include one or more processor(s) 204 that are operably connected to memory 206. In at least one example, the one or more processor(s) 204 may be one or more central processing unit(s) (CPU), graphics processing unit(s) (GPU), both a CPU and GPU, or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 204 may also be responsible for executing all computer applications stored in the memory, which can be associated with common types of volatile (RAM) and/or nonvolatile (ROM) memory.

In some examples, memory 206 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 206 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 206 may include an operating system 208, a data collector module 210, an image recognition module 212, a data analysis module 214, individual plant data-store 216, plant batch data-store 218, a growth operation data-store 220, an output module 222, and a user interface 224. The operating system 208 may be any operating system capable of managing computer hardware and software resources.

In the illustrated example, the data collector module 210 may receive sensor data 108 from the controller system 118 of the plant growth operation 106. In some examples, each individual plant within the plant growth operation 106 may have a dedicated set of environmental sensor(s) 114 and image capturing device(s) 116. Thus, the data collector module 210 may receive environmental data and image data associated with each individual plant, and in some cases a batch of plants 104 or the plant growth operation 106.

In the illustrated example, the image recognition module 212 may employ object recognition algorithms to identify individual plants from image data received by the data collector module 210. Object recognition algorithms may generate image-based signatures of individual plants within the plant growth operation. The image-based signatures may be used as templates for comparison with image data received from the data collector module 210. In some examples, the use of object recognition algorithms may be combined with stereoscopic analysis or structured light analysis techniques to develop three dimensional image-based signatures for individual plants. Further, image-based signatures for individual plants may be derived from a subpart of an individual plant, such as a branch structure, or leaf-vein structure. Alternatively, image-based signatures may be based on an appearance of the individual plant, as a whole.

Object recognition algorithms may employ appearance-based and feature-based methods to help identify individual plants from within a batch of plants. These same techniques may also be used to quantify changes in color, size, and shape of subparts of individual plants, or individual plants as a whole. Appearance-based methods may identify an individual plant based on a comparison with template images. Appearance-based methods may use several images of an object to reliably represent an appearance under varying viewing conditions. Varying viewing conditions may include changes in lighting, color, and viewing direction. The term 'viewing direction' as used herein may describe the translation, scale, rotation and skew invariant of a captured image. Appearance-based methods may be useful because plants will be subject to changes in lighting and color based on the time of day and as progress through their life cycle, respectively. Further, a plant may be inadvertently moved from one position to another position with the plant growth operation. In this instance, appearance-based methods may account for the change in viewing direction.

Feature-based methods may extract features from objects, such as surface patches, corners, and linear edges, as a means of identifying the underlying object. Feature-based methods may be useful in recognizing changes in shape and size of objects, such as individual plants, which markedly maintain the same features. For example, feature-based methods may detect branch patterns and leaf vein patterns that may grow in size, but maintain the same signature patterns.

In the illustrated example, the data analysis module 214 may aggregate and associate sensor data from the data collector module 210 with an appropriate database record. The database record may correspond to an individual plant, a batch of plants, or the plant growth operation. In a non-limiting example, the data analysis module 214 may identify a database record for an individual plant based on identification performed by the image recognition module 212. Further, the data analysis module 214 may associate the sensor data—image data and environmental data—to the appropriate database record.

In various examples, the data analysis module 214 may associate three metadata tags with each image from the data collector module 210. The metatags may separately identify the plant, batch, and growth operation, based at least in part on the identification performed by the image recognition module 212. Environmental data associated with the image data may be aggregated using the metadata tags of the image data.

In the illustrated example, the individual plant data-store 216 may include database records of image data and environmental data associated with individual plants. The image data and the environmental data may be associated with corresponding database records based on assigned metadata tags. Further, the environmental data may be temporally associated with images based on the assigned metadata tags.

In the illustrated example, the plant batch data-store 218 may include database records of image data and environmental data associated with batches of plants. The image data and the environmental data may be associated with corresponding database records based on assigned metadata tags. Further, the environmental data may be temporally associated with images based on the assigned metadata tags.

In the illustrated example, the growth operation data-store 220 may include database records of image data and environmental data associated with the plant growth operation. The image data and the environmental data may be associated with corresponding database records based on assigned metadata tags. Further, the environmental data may be temporally associated with images based on the assigned metadata tags.

In the illustrated example, the output module 222 may transmit data streams to the harvest analysis server 130 for further processing and analysis. The data streams may include database records associated with the individual plant data-store 216, plant batch data-store 218, and the growth operation data-store 220.

In the illustrated example, the user interface 224 may allow a plant grower to configure various aspects of how image data and environmental data is captured by the one or more sensors 114 116. Further, the user interface 224 may allow a plant grower to configure triggering events, or establish environmental thresholds that trigger a recording of image data and environmental data by the controller system 118 of the plant growth operation 106. In a non-limiting example, the user interface 224 may be used to configure environmental sensors to record environmental data in instances when an image is captured. Alternatively, or additionally, the user interface may configure a triggering event that causes the environmental sensors to record environmental data. For example, if the temperature of a plant leaf exceeds an allowable limit, non-contact infra-red temperature sensors may record the temperature reading. Similarly, if the color of a plant leaf is beyond an allowable spectrum of color, the photoelectric sensors may record the color changes. Further, a plant grower may also receive alerts via the user interface 224 in cases where environmental data exceed allowable thresholds. The plant grower may also configure parameters that control a time-lapse sequence recorded by an image capturing device. For example, the plant grower may configure the image capturing device(s) to capture an image of an individual plant at regularly-spaced time intervals. The plant grower may also include a conditional rule that shortens the time interval between captured images based on a triggering event. The triggering event may be based on image data or environmental data.

In the illustrated example, the plant health monitoring system 202 may further include input/output interface(s) 226. The input/output interface(s) 226 may include any type of output interface known in the art, such as a display (e.g., a liquid crystal display), speakers, a vibrating mechanism, or a tactile feedback mechanism. Input/output interface(s) 226 also include ports for one or more peripheral devices, such as headphones, peripheral speakers, or a peripheral display. Further, the input/output interface(s) 226 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

In the illustrated example, the plant health monitoring system 202 may include one or more network interface(s) 228. The one or more network interface(s) 228 may include any sort of transceiver known in the art. For example, the one or more network interface(s) 228 may include a radio transceiver that performs the function of transmitting and receiving radio frequency communications via an antenna. In addition, the one or more network interface(s) 228 may also include a wireless communication transceiver and a near field antenna for communicating over unlicensed wireless Internet Protocol (IP) networks, such as local wireless data networks and personal area networks (e.g., Bluetooth or near field communication (NFC) networks). Further, the one or more network interface(s) 228 may include wired communication components, such as an Ethernet port or a Universal Serial Bus (USB).

Figure 3:
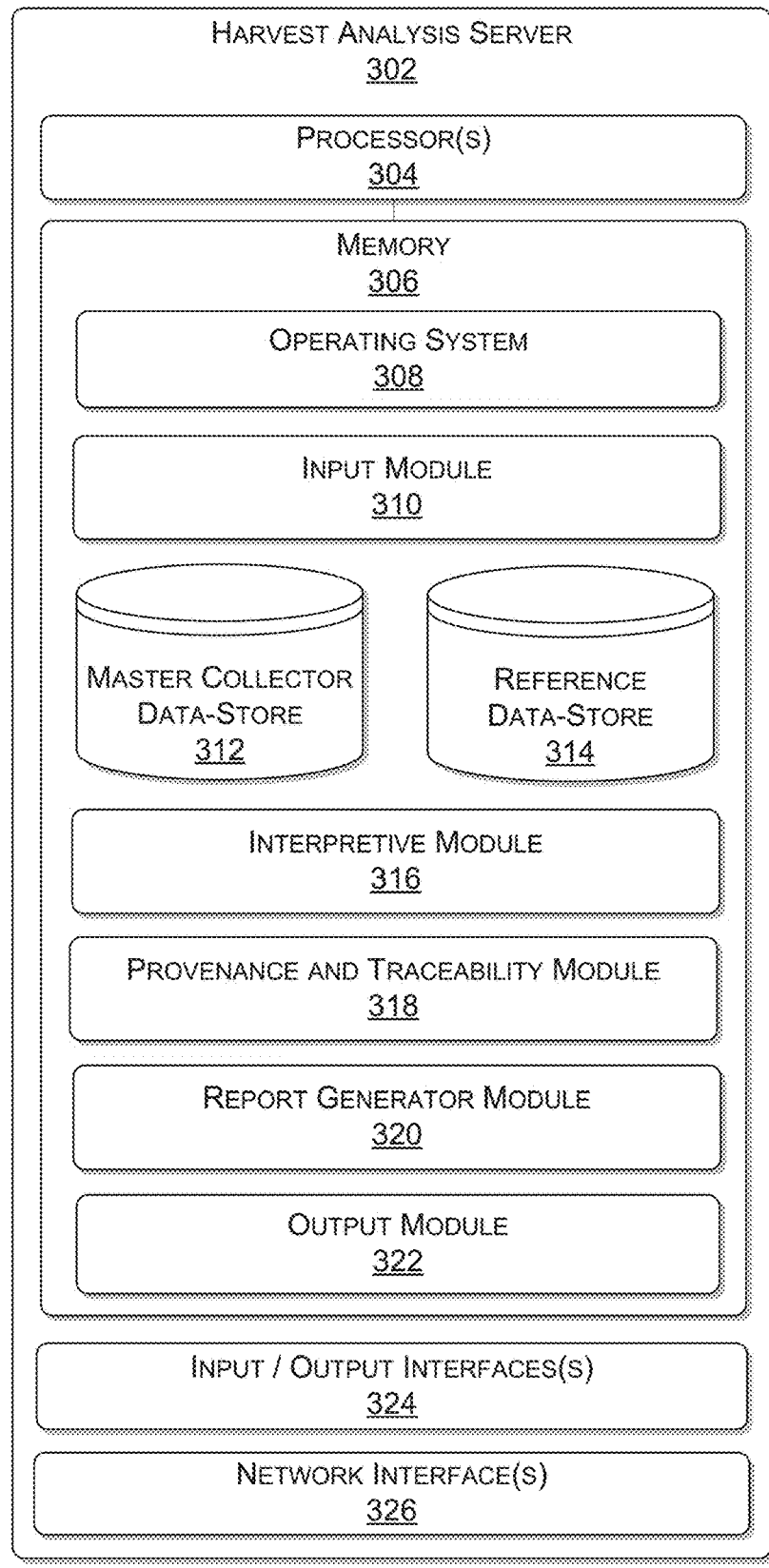
FIG. 3 illustrates a block diagram of a harvest analysis server that generates financial instruments that are based on real-time plant growth data of individual plants within the plant growth operation that depict the likelihood of plant loss and plant spoilage.

FIG. 3 illustrates a block diagram of a harvest analysis server 302 that may predict a harvest date for a plant growth operation, and generate financial instruments based on real-time plant growth data and the predicted harvest date. In the illustrated example, the harvest analysis server 302 may correspond to the harvest analysis server 130. The harvest analysis server 302 may include one or more processor(s) 304 operably connected to memory 306. The one or more processor(s) 304 may correspond to the one or more processor(s) 204, and the memory 306 may correspond to the memory 206.

In the illustrated example, the memory 306 may include an operating system 308, an input module 310, a master collector data-store 312, a reference data-store 314, an interpretive module 316, a provenance and traceability module 318, a report generator module 320, and an output module 322. Further, the operating system 308 may correspond to the operating system 208.

In the illustrated example, the input module 310 may receive a data stream from the plant health monitoring system 202. The data stream may include image data and environmental data associated with an individual plant, a batch of plants, or a plant growth operation. Further, the input module 310 may also receive third party data that relates to determining plant health or pricing of a plant harvest.

In the illustrated example, the master collector data-store 312 may store data streams received from the plant health monitoring system 202. The data streams may be associated with individual plants, batches of plants, or individual growth operations.

In the illustrated example, the reference data-store 314 may include image data and environmental data associate with earlier iterations of plant growth operations. The reference data-store 314 may also include third party data that relates to determining plant health and the pricing of a plant harvest. Third party data may include actuarial data that may be used to generate non-futures contract products, such as insurance rates for plant loss or spoilage protection. Further, third party data may also include plant harvest statistics, as a means of understanding a financially optimum time to harvest a growth operation. Plant harvest statistics may also help determine the best time to seed a plant growth operation, based on supply, demand, and environmental conditions.

In the illustrated example, the interpretive module 316 may generate a plant metric that describes a likelihood of plant maturity, loss, or spoilage during a plant life cycle. By monitoring plant growth through an entire life cycle, a plant grower has an ability to detect, at an early stage, the development of a condition that could lead to plant spoilage, and potentially avert a quality recall of plants that harbor those conditions. The plant health metric may be updated in real-time to reflect a current health status of an individual plant, a batch of plants, or entire plant growth operation. A benefit of doing so is to allow a plant grower to forecast, in real-time, an updated risk associated with spoilage of a current growth operation. In some examples, the interpretive module 316 may automatically detect the presence of a condition based on a comparison of image data received from the plant health monitoring system 202 and a repository of plant health data stored with the reference data-store 314. Further, the interpretive module 316 may also monitor changes in the rate of growth, size, shape, and even photosynthesis to determine a likelihood of plant maturity, loss, or spoilage during a plant life cycle.

The interpretive module 316 may predict a harvest date based on the plant health metric(s) and current plant growth progress through the plant life cycle. The interpretive module 316 may also rely on third party data from the reference data-store 314. Predicting a harvest date may allow a plant grower to predicate a date for planting a new crop. Doing so may allow a plant grower to align the harvest date of a new crop with peak market conditions. In some examples, the interpretive module 316 may update a predicted harvest date as plant growth progresses through a plant life cycle.

The interpretive module 316 may also generate a financial risk assessment of a current plant growth operation. The financial risk assessment may quantify, in financial terms, the risk of plant loss and spoilage within the plant growth operation. The financial risk assessment may be based on the plant health metric(s), the predicted harvest date, and third party data from the reference data-store 314. In some examples, a plant grower may use the financial risk assessment to mitigate the cost of financing a plant growth operation. Alternatively, or additionally, the financial risk assessment may be used to generate one or more financial instruments for distribution to financial institutions as support for securing capital to fund the plant growth operation.

In the illustrated example, the provenance and traceability module 318 may provide a means of tracing the provenance of a particular individual plant to a batch of plants or a particular plant growth operation. In a non-limiting example, the provenance and traceability module 318 may associate an identifier, such as an electronic tag, with individual plants. The electronic tags may include Quick Response (QR) code, a bar code, a Near Field Communication (NFC) code, or a radio frequency identification (RFID) code. In other examples, the identifier may be a numerical identifier that can be traced to the batch of plants. An electronic tag may be helpful in tracing the provenance of an individual plant product after harvest, because the form of the produce of the plant harvest may be too different for analysis with object recognition algorithms. In this instance, the provenance and traceability module 318 may assign each individual plant with an identifier that can be used to access image data and environmental data that was recorded and analyzed during the plant life cycle. Thus, if a plant is identified as defective after harvest, the identifier can be used to review image data and environmental data for the purpose of understanding whether the defect occurred during the plant life cycle, and whether other individual plants within the batch of plants or the growth operation were affected.

In the illustrated example, the report generator module 320 may generate a financial instrument based at least in part on the financial risk assessment performed by the interpretive module 316. Financial instruments may make use of third party data in combination with sensor data from the plant health monitoring system 202. The financial instruments may include futures contracts, options contracts, derivatives of a futures contracts, and non-futures products. A futures contract is an agreement to buy or sell assets at a fixed price but to be delivered and paid for a later date. In this instance, the value of a futures contract, in the context of a plant growth operation, is influenced by the harvest date and the predicted plant maturity, loss, and spoilage at the time of harvest. An options contract is a financial derivative that provides a buyer with the right, but not the obligation, to purchase (call) or sell (put) an underlying security at an agreed-upon price during a certain period of time or on a specific date, also known as the exercise date. In this instance, the underlying security may correspond to the predicted harvest, and the exercise date may correspond to the harvest date. Thus, the value of an option in the context of a plant growth operation is influenced by the harvest date, and the predicted plant maturity, loss, and spoilage at the time of harvest. Additionally, derivative is a contract between two or more parties with a price that is dependent, or derived from an underlying asset. In this instance, the value of the derivative is derived from the value of the harvest of the plant growth operation. Thus, the value of a derivative in the context of a plant growth operation is influenced by the plant maturity, loss, and spoilage at the time of harvest.

In various examples, financial instruments may be generated and modified in real-time, for the purpose of maximizing value to the grower. For example, as the date of harvest draws near, a likelihood of spoilage may correspondingly decrease. Thus, an updated futures contract may reflect terms more favorable to the grower. Further, actuarial data may be used to establish non-futures products, such as insurance rates for operators of the plant growth operations.

The report generator module 320 may also generate a report that predicts a harvest date based on a prediction provided by the interpretive module 316. Further, the report may also identify the best time to start growing a crop, based on historical incidences of plant spoilage, loss and peak market demand conditions.

In the illustrated example, the output module 322 may transmit the financial instruments to one or more financial institutions for on-selling to contract purchasers. Contract purchasers may include consumers, farmers, retailers, or institutional traders with an interest in investing in the production and supply of plant products.

In the illustrated example, the harvest analysis server 302 may include input/output interface(s) 324 and network interface(s) 326. Further, the input/output interface(s) 324 and the network interface(s) 326 may correspond to the input/output interface(s) 226 and the network interface(s) 228 respectively.

In various examples, the computations performed by modules within the harvest analysis server 302 may be performed in part, or in whole, by similarly identifiable modules in the plant health monitoring system 202, and vice versa. Similarly, the data-stores included within the harvest analysis server 302 may be included in the plant health monitoring system 202, and vice versa.

Figure 4:
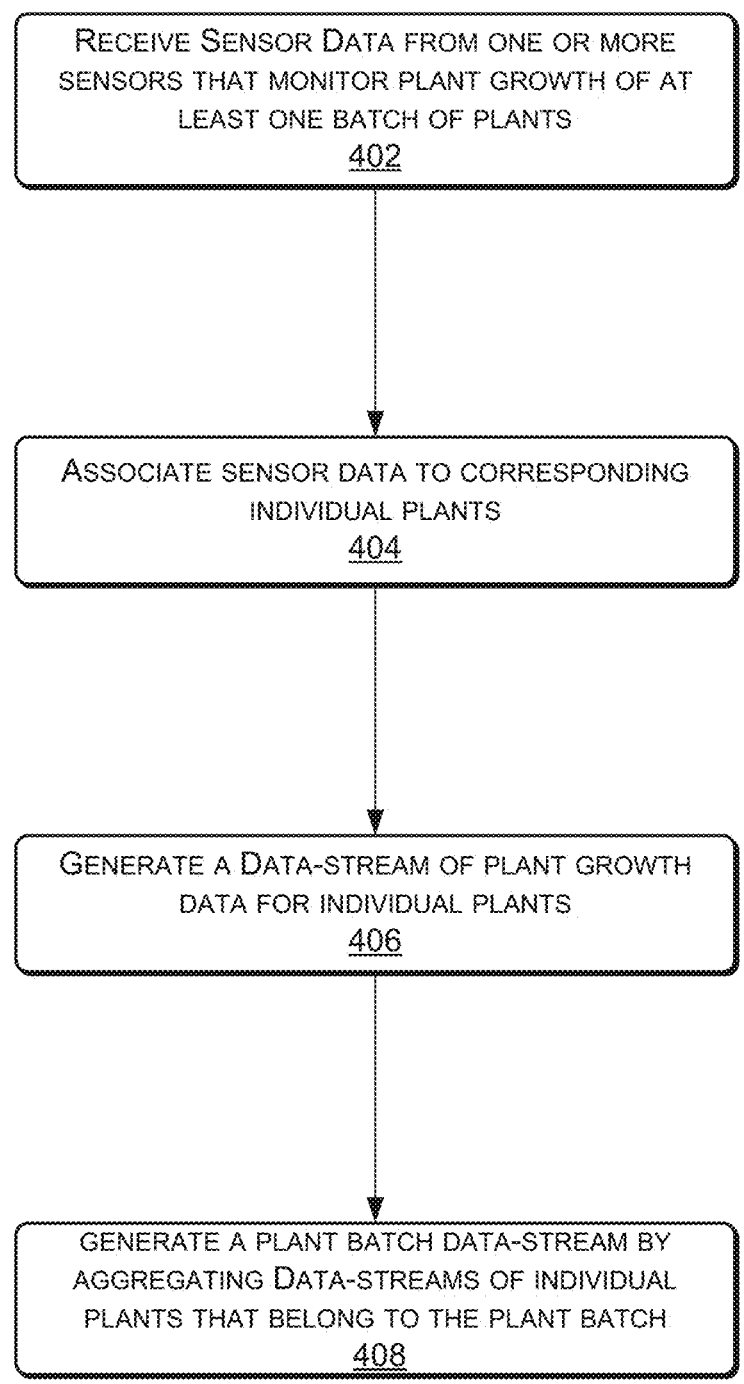
FIG. 4 illustrates a flow diagram of a process for generating a data stream of plant growth data that corresponds to a batch of plants within a growth operation.

FIG. 4 illustrates a flow diagram of a process for generating a data stream of plant growth data that corresponds to a batch of plants within a growth operation. The data stream may be updated in real-time based on a flow of sensor data from one or more sensors within the plant growth operation. The one or more sensors may include sensors that capture environmental conditions that surround the batch of plants and camera devices capable of capturing time-lapse images.

At 402, the plant health monitoring system may receive sensor data from one or more sensors that monitor the plant growth of at least on batch of plants. The sensor data may include time-lapse images of individual plants within the batch of plants, and environmental data that measure characteristics of individual plants, and the batch of plants as a whole. For example, environmental data may monitor characteristics such as thermal radiation, color, and temperature of an individual plant. In some instances, the environment sensor data may be derived from a subpart of the individual plant, such as a particular leaf structure, branch structure, or stem structure. Further, the environmental data may also measure characteristics that surround the individual plant and apply to the batch of plants as a whole. For example, a measurement of carbon dioxide intake or a measurement of the production of oxygen may reflect the rate of photosynthesis in the batch of plants.

At 404, the plant health monitoring system may associate the sensor data to a particular individual plant within the batch of plants. In a non-limiting example, the plant health monitoring system may receive sensor data associated with several individual plants at the same time, and may be required to identify which portions of the sensor data correspond to which particular individual plants. Since the sensor data includes time lapse images of the individual plants, object recognition algorithms may be used compare the time-lapse images of the individual plants to previously stored plant-based signatures for all individual plants. Once the plant health monitoring system identifies a match between an appearance or feature of an individual plant in a time-lapse image and a stored plant-based signature, the time-lapse image and associated sensor data may be aggregated with previously stored sensor data of the individual plant with the matching plant-based signature.

At 406, the plant health monitoring system may generate a data-stream that include plant growth data for the individual plants. The plant growth data may include the aggregated sensor data, such as time lapse images, and environmental data, such as thermal radiation, color profile, and a temperature profile of the individual plant.

At 408, the plant health monitoring system may generate a plant batch data-stream by aggregating the data-streams that correspond to the individual plants that belong to the plant batch. Further, environmental sensors that detect an uptake of carbon dioxide and production of oxygen may be associated with the plant batch data-stream.

Figure 5:
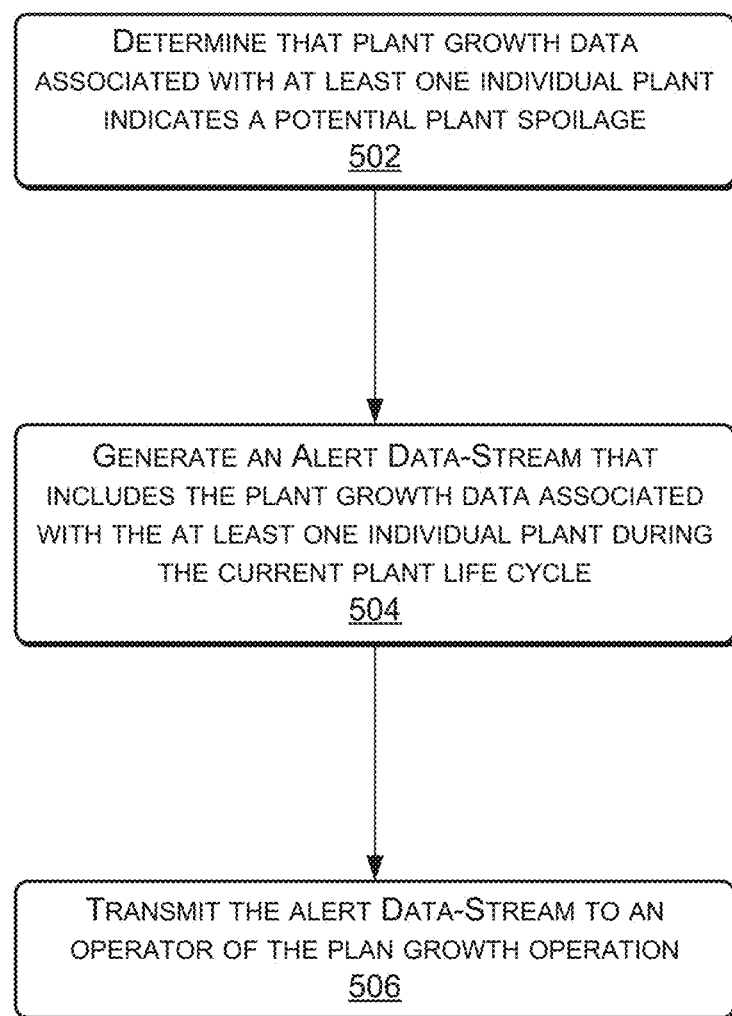
FIG. 5 illustrates a flow diagram of a process for alerting a plant grower of a potential plant loss or spoilage.

FIG. 5 illustrates a flow diagram of a process to alert a plant grower of an impending or actual plant spoilage. The alert may be transmitted to any electronic device that is associated with the operator, and is intended to identify an impending, or actual plant spoilage based on sensor data received by the plant health monitoring system.

At 502, the plant health monitoring system may determine that at least one individual plant may spoil. Plant spoilage may be reflected in plant growth data that indicates a change of shape, contour, or color of a plant leaf structure, stem structure, or overall appearance. Further, environmental data may indicate irregularities in thermal radiation or temperature. Additionally, or alternatively, an indication of a low carbon dioxide intake and a low oxygen production may suggest that the rate of photosynthesis for the batch of plants is below a predetermined threshold.

At 504, the plant health monitoring system may generate an alert data stream that includes the plant growth data associated with the at least one individual plant during the current plant life cycle. The purpose of doing so is to provide a plant grower with sufficient background information that a potential cause of the impending or actual plant spoilage can be identified. For example, a review of plant growth data may indicate that plant deterioration coincided with a lack of water or sunlight at a particular point in time.

At 506, the plant health monitoring system may transmit the alert data-stream to an electronic device associated with the operator. The alert may comprise of an indication that a data-stream that may indicate plant deterioration is available for review on the plant health monitoring system.

Figure 6:
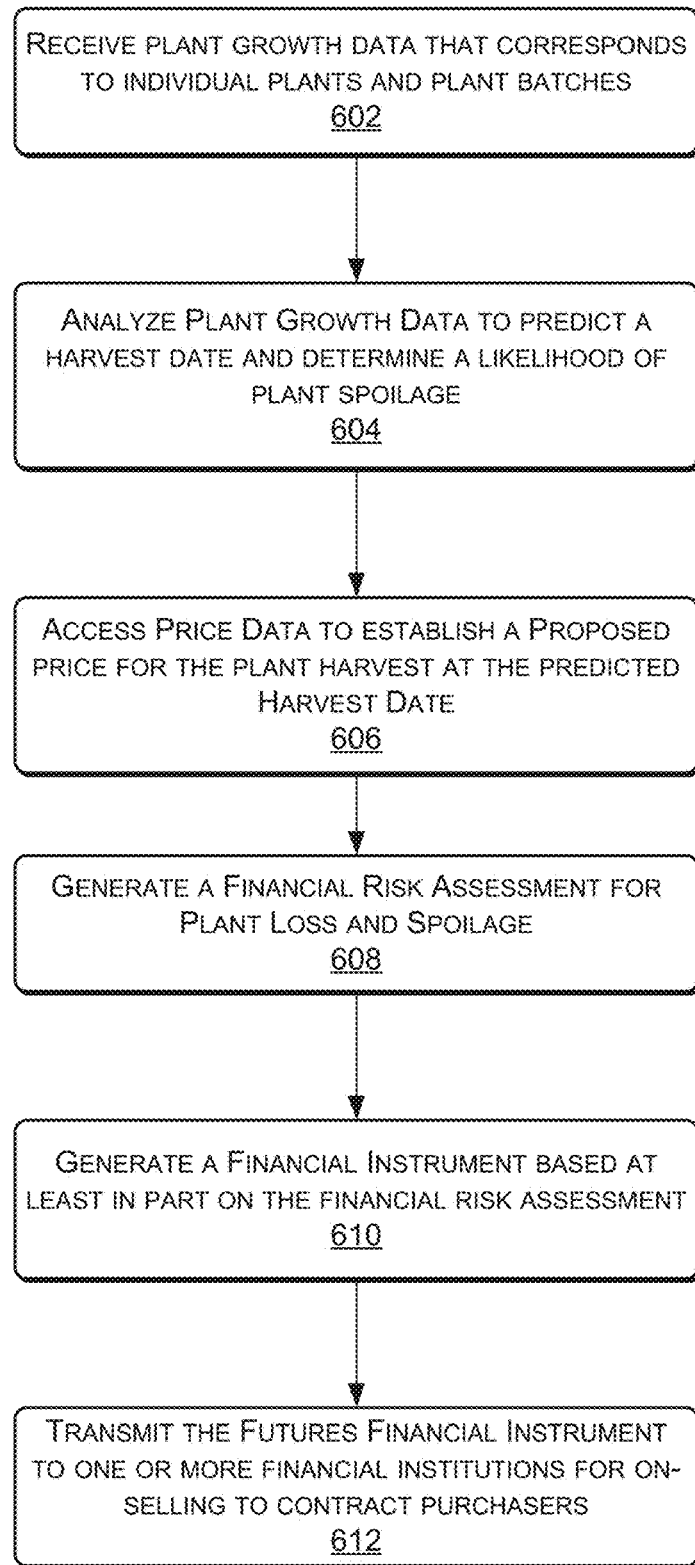
FIG. 6 illustrates a flow diagram of a process to generate and transmit financial instruments that may be used to secure capital that funds the plant growth operation.

FIG. 6 illustrates a flow diagram of a process to generate and transmit financial instruments that may be used to secure capital that funds the plant growth operation. The financial instruments may include futures contracts, options, and derivatives that derive their value from the harvest of the plant growth operation at the time of harvest. Since each financial instrument is based on a predicted value of an underlying asset at a given date, that is the harvest of the plant growth operation on the harvest date, an accurate assessment of an expected harvest and harvest date can improve the value of futures contract, options and derivatives, by reducing the underlying risk of over-evaluation.

At 602, the harvest analysis server may receive plant growth data that corresponds to individual plants and batches of plants. The plant growth data may include time-lapse images of an individual plant during the plant life cycle, as well as environmental data, such as thermal radiation, color profile, and a temperature profile of the individual plant. Plant growth data associated with batches of plants may include additional environmental data such as the uptake of carbon dioxide and the production of oxygen, as an indication of the rate of photosynthesis.

At 604, the harvest analysis server may analyze the plant growth data to predict a harvest date and quantify a plant health metric that describes a likelihood of plant maturity, loss, or spoilage during its life cycle. The plant health metric may be updated in real-time to reflect a current health status of an individual plant, a batch of plants, or entire plant growth operation. A benefit of doing so is to allow a plant grower to forecast, in real-time, an updated risk associated with spoilage of a current growth operation.

At 606, the harvest analysis server may access price data from a third party database to determine a proposed price for a harvest of a batch of plants or the entire plant growth operation. The proposed price may be influenced by the current supply of the harvested plant within the community at the time of the predicted harvest date, and the volume of harvest.

At 608, the harvest analysis server may generate a financial risk assessment of harvesting the current plant growth operation at the predicted harvest date. The harvest analysis server may use the plant growth data associated with individual plants, batches of plants, and the entire plant growth operation to establish a risk of plant loss and plant spoilage at the predicted harvest date. Further, the financial consequence of plant loss and plant spoilage may be established in part by combining the risk of plant loss and plant spoilage with the proposed price for the harvest at the predicted harvest date.

In various examples, the financial risk assessment may be updated in real-time as the plant growth data is continuously updated during the plant life cycle. In other words, an initial financial risk assessment at a point in time near plant germination may impose a higher financial risk of spoilage, relative to the financial risk assessment that occurs at a point in time closer to the predicted harvest date, simply because there is more opportunity for plant spoilage to occur at germination. Thus, as the plant life cycle approaches harvest, the financial risk assessment may be refined using real-time plant growth data, which may ultimately reduce the financial risk of spoilage, provided that the plant growth data suggests the same.

At 610, the harvest analysis server may generate a financial instrument based at least in part on the financial risk assessment. The financial instrument may include a futures contract to buy or sell at least a portion of the harvest at a fixed price to be delivered and paid at the predicted harvest date. In another example, the financial instrument may include an options contract which provides a buyer with a right, but not the obligation to place a call or put on a portion of the harvest at an agreed-upon price on the harvest date, or another agreed upon date. In another example, the financial instrument may be a non-futures product based on actuarial data, such as an insurance rate for operators of the plant growth operation.

At 612, the harvest analysis server may transmit the one or more financial instruments to one or more financial institutions for on-selling to contract purchasers. In some examples, contract purchasers may include consumers, farmers, retailers, or institutional traders with an interest in investing in the production and supply of plant products.

Figure 7:
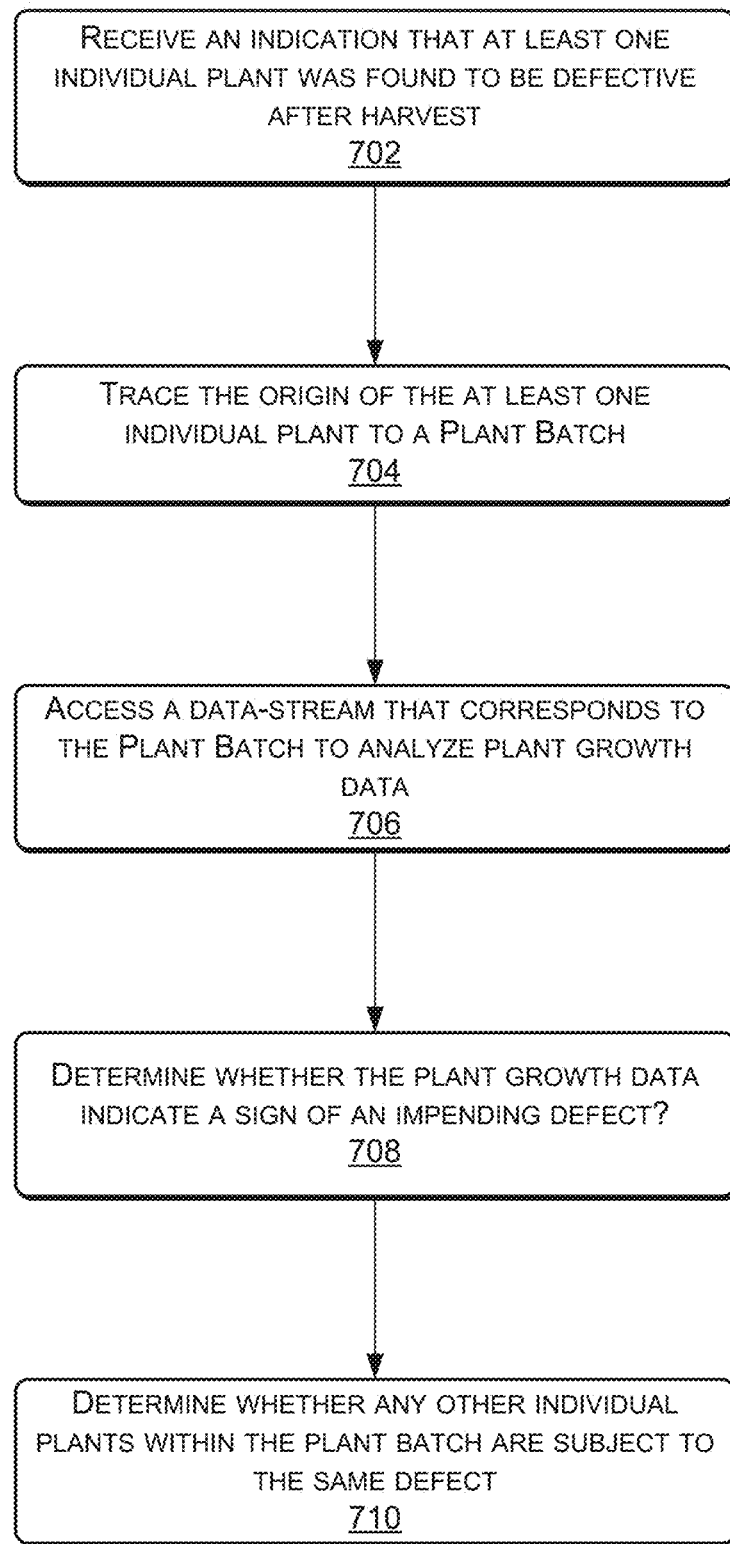
FIG. 7 illustrates a flow diagram of a process to trace a defective plant provenance for the purpose of determining whether any other individual plants may share the same defect.

FIG. 7 illustrates a flow diagram of a process to trace a defective plant provenance for the purpose of determining whether any other individual plants may share the same defect.

At 702, the harvest analysis server may receive an indication that at least one individual plant within a batch of plants was found to be defective after harvest. The indication may be from plants sold after the harvest. The defect may include any type of plant-based defect, such as a discoloration or a lack of plant maturity.

At 704, the harvest analysis server may trace the origin of the at least one individual plant to a particular plant batch. Once plants are harvested, the produce of the harvest can be traced to the batch of plants via an appropriate identifier. The appropriate identifier may include an electronic tag, such as a Quick Response (QR) code, a bar code, a Near Field Communication (NFC) code, or a radio frequency identification (RFID) code. In other examples, the identifier may be a numerical identifier or an alphanumerical identifier that can be traced to the batch of plants.

At 706, the harvest analysis server may access a datastream that corresponds to the particular plant batch that once contained the individual plant that was found to be defective. In this instance, the harvest analysis server may review the plant growth data for the batch of plants identified as including the defective individual plant. In some cases, it may be possible to identify the actual defective individual plant using object recognition algorithms. In other examples, the form of the individual plant may have altered to an extent that using object recognition algorithms are no longer feasible.

At 708, the harvest analysis server may determine whether the plant growth data indicates a sign of an impending defect. A review of the plant growth data may include a review of time-lapse images and environmental data associated with all individual plants within the batch of plants with an eye for identifying the type of defect found. For example, if the defect found involved a discoloration of leaf structure, time-lapse images of individual plants may be reviewed with an eye for identifying that same discoloration. Further, sensor data from photo-electronic sensors may also be reviewed to determine whether a discoloration was present during the plant life cycle.

At 710, the harvest analysis server may determine whether any other individual plants within the plant batch are subject to the same defect. In some examples, if multiple individual plants within a single batch were found to show the same defect, those same individual plants can be recalled based at least in part on the traceability of plant provenance.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:
1. A system, comprising:
one or more processors; and
memory coupled to the one or more processors, the memory including one or more modules that are executable by the one or more processors to:
detect, via an image capturing device, a discoloration of a leaf structure of an individual plant within a plant growth operation for a current crop of individual plants and batches of plants;

in response to detecting the discoloration of the leaf structure, output a trigger to control a monitoring of a cluster of leaf structures associated with the individual plant to detect whether the cluster of leaf structures includes the discoloration;

in response to detecting the discoloration in the cluster of leaf structures, capture image data and environmental conditions associated with a batch of plants that include the individual plant, the environmental conditions including at least an uptake of carbon dioxide and a production of oxygen;

identify a dataset of stored images associated with the individual plant, the dataset of stored images including stored images of the individual plant over a predetermined time interval;

determine a similarity between the image data and a stored image from the dataset of stored images;

generate a health metric for the individual plant that quantifies a risk likelihood of plant spoilage prior to harvest, the health metric being based at least in part on the similarity;

generate a financial risk assessment of the plant growth operation, the financial risk assessment quantifying in financial terms the risk of plant spoilage of the current crop based at least in part on the health metric of the individual plant and including a data stream of risk data that is suitable for generating a financial instrument;

generate a financial instrument based at least in part on the financial risk assessment; and output the financial instrument to a financial institution.

2. The system as recited in claim 1, wherein the image data corresponds to a first image, the similarity is a first similarity, and the dataset of stored images is a first data set of stored images, and wherein the one or more modules are further executable by the one or more processors to:

determine a second similarity between the first image and an additional image of a second dataset of stored images, the second dataset of stored images including individual images of additional plants within the batch of plants; and assign a plant identifier to the first image, based at least in part on the second similarity, the plant identifier being associated with the additional image.

3. The system as recited in claim 1, wherein the one or more modules are further executable by the one or more processors to:

identify, within the image data, a first branch of the individual plant, and wherein to determine the similarity between the image data and the stored images is based at least in part on a comparison of the first branch and a second branch of the individual plant.

4. The system as recited in claim 1, wherein the health metric numerically quantifies the discoloration of the leaf structure of the individual plant.

5. The system as recited in claim 1, wherein the one or more modules are further executable by the one or more processors to:

capture a first set of image data of the individual plant from a first image capturing device, and a second set of image data of the individual plant from a second image capturing device, the first set of image data being captured from a different angle to the second set of image data; and process, via stereoscopic analysis, the first set of image data and the second set of image data to generate a three-dimensional model of the individual plant, wherein the dataset of stored images associated with the individual plant corresponds to the three-dimensional model of the individual plant.

6. The system of claim 1, wherein the financial instrument includes a price of a future plant harvest based on a value of an underlying asset at a given date.

7. The system of claim 1, wherein the one or more modules are executable by the one or more processors further to update the financial risk assessment continuously in real time.

8. A computer-implemented method, comprising:

under control of one or more processors:

detecting, via an image capturing device, a discoloration of a leaf structure of an individual plant within a particular plant growth operation for a current crop of individual plants and batches of plants;

in response to detecting the discoloration of the leaf structure, outputting a trigger to control a monitoring of a cluster of leaf structures associated with the individual plant to detect whether the cluster of leaf structures includes the discoloration;

in response to detecting the discoloration in the cluster of leaf structures, capturing image data and environmental conditions associated with a particular plant batch associated with the individual plant, the environmental conditions including at least an uptake of carbon dioxide and a production of oxygen, wherein the particular plant batch is associated with a plurality of plant batches, the plurality of plant batches is associated with a plurality of growth operations that include the particular growth operation, and a subset of the image data corresponds to the particular plant growth operation of the plurality of plant growth operations;

associating a first set of metadata to the image data, the first set of metadata identifying individual plants of a plurality of individual plants;

associating a second set of metadata to the image data, the second set of metadata identifying individual plant batches of the plurality of plant batches;

associating a third set of metadata to the image data, the third set of metadata identifying individual growth operations of the plurality of growth operations;

generating a data stream of risk data suitable for generating a financial instrument based at least in part on the subset of the image data;

generating a financial risk assessment based at least in part on the data stream, the financial risk assessment quantifying in financial terms the risk of plant spoilage of the current crop based at least in part on a health metric of the individual plant and including the data stream of risk data;

generating a financial instrument based at least in part on the financial risk assessment; and outputting the financial instrument to a financial institution.

9. The computer-implemented method as recited in claim 8, further comprising:

aggregating the image data based at least in part on one of the first set of metadata or the second set of metadata.

10. The computer-implemented method as recited in claim 9, wherein a subset of the image data corresponds to a particular plant of the plurality of individual plants, the subset of the image data providing a time-lapse sequence of images that illustrate growth of the particular plant over a predetermined period of time.

11. The computer-implemented method as recited in claim 8, wherein a subset of the image data corresponds to the particular plant batch of the plurality of plant batches, the subset of the image data indicating a likelihood of plant spoilage prior to harvest.

12. The computer-implemented method as recited in claim 8, further comprising:
aggregating the image data, based at least in part on a particular growth operation of the plurality of growth operations.

13. The computer-implemented method as recited in claim 8, wherein the data stream includes at least one of a first dataset associated with plant maturity, a second dataset associated with plant loss, a third dataset associated with plant quality, or a fourth dataset associated with plant spoilage.

14. The computer-implemented method of claim 8, further comprising:
determining that a rate of photosynthesis associated with the individual plant is below a predetermined threshold, based at least in part on the environmental conditions, and
wherein receiving the image data associated with at least the plant batch is further based at least in part on the rate of photosynthesis.

15. One or more non-transitory computer-readable media storing computer-readable instructions, that when executed on one or more processors, cause the one or more processors to perform acts comprising:
monitoring environmental conditions associated with an individual plant within a plant batch in a plant growth operation for a current crop of individual plants and batches of plants, the environmental conditions including at least an uptake of carbon dioxide and a production of oxygen;
in response to the environmental conditions being below a predetermined threshold, receiving a plurality of images that correspond to the individual plant, the plurality of images providing a time-lapse sequence of images that illustrate plant growth over a predetermined period of time;
analyzing the plurality of images and the environmental conditions to generate plant growth data associated with the individual plant, the plant growth data including at least one of a rate of change in shape, size, or color of the individual plant;
determining that a plant health metric of the individual plant indicates a likelihood that the individual plant is to spoil prior to a predicted harvest date, based at least in part on the plant growth data;
generating a financial risk assessment of the plant growth operation, the financial risk assessment quantifying in financial terms the risk of plant spoilage of the current crop based at least in part on the plant health metric of the individual plant and the plant growth data of the individual plant;
generating a financial instrument based at least in part on the financial risk assessment; and
outputting the financial instrument to a financial institution.

16. The one or more non-transitory computer-readable media as recited in claim 15, further comprising:
receiving sensor data that corresponds to the individual plant within the batch of plants, the sensor data corresponding to environmental conditions associated with the individual plant; and
correlating the sensor data with the time-lapse sequence of images that illustrate plant growth over the predetermined period of time,
wherein analyzing the plurality of images to determine a plant health metric is further based at least in part on the sensor data.

17. The one or more non-transitory computer-readable media as recited in claim 16, wherein the sensor data corresponds to at least one of thermal radiation data associated with the individual plant or color data associated with the individual plant.

18. The one or more non-transitory computer-readable media as recited in claim 16, wherein the sensor data corresponds to at least one of a first data set indicating carbon dioxide uptake by the batch of plants or a second data set indicating a production of oxygen by the batch of plants, and further comprising:
determining a rate of photosynthesis based at least in part on the first data set or the second data set,
wherein the plant health metric is further based at least in part on the rate of photosynthesis.

19. The one or more non-transitory computer-readable media as recited in claim 15, wherein the financial instrument corresponds to at least one of a futures contract, an option, or a derivative based at least in part on the futures contract.

20. The one or more non-transitory computer-readable media as recited in claim 15, further comprising:
accessing a reference lookup table that correlates an estimate price of harvest with harvest dates; and
determining the predicted harvest date based at least in part on the reference lookup table.

\* \* \* \* \*